United States Patent [19]
Fujie et al.

[11] Patent Number: 5,576,778
[45] Date of Patent: Nov. 19, 1996

[54] DESIGN SYSTEM FOR DESIGNING SHAPES OF EYEGLASSES

[75] Inventors: Ryuto Fujie, Himeji; Hiroyuki Fujie, Kobe; Kunie Takeuchi, Himeji, all of Japan

[73] Assignee: Paris Miki Inc., Tokyo, Japan

[21] Appl. No.: 312,627

[22] Filed: Sep. 27, 1994

[30] Foreign Application Priority Data

Dec. 15, 1993 [JP] Japan .................................. 5-342232

[51] Int. Cl.$^6$ .............................. G02C 13/00; A61B 3/10; G01B 1/00
[52] U.S. Cl. .............................. 351/177; 33/200; 33/507
[58] Field of Search .................................. 351/177, 178, 351/159; 33/200, 507

[56] References Cited

U.S. PATENT DOCUMENTS 4,817,024  3/1989  Saigoh .................................. 33/200
5,175,941  1/1993  Ziegler et al. .......................... 33/200

*Primary Examiner*—Scott J. Sugarman
*Attorney, Agent, or Firm*—Oblon, Spivak, McClelland, Maier & Neustadt, P.C.

[57] ABSTRACT

A design system for designing shapes of eyeglasses. In the system, image data expressing the face of a person are first subjected to image processing such as color compensation and profile emphasis. Subsequently, feature points representing the facial features of the face are extracted, and a plurality of horizontal, vertical and inclined auxiliary lines and auxiliary points on the auxiliary lines are set based on the feature points. Anchor points of a Bezier curve which defines the shapes of the lenses and frame of the eyeglasses are then determined. The Bezier curve is converted to data composed of polar coordinates, and the converted data are transmitted to machine tools. Control points provided at the anchor points are controlled based on words which represent a desired design image for the eyeglasses. The design system can automatically generates the shapes of the lenses and frames of eyeglasses based on features of individuals and their design preferences.

4 Claims, 21 Drawing Sheets

DESIGN SYSTEM FOR DESIGNING SHAPES OF EYEGLASSES

BACKGROUND OF THE INVENTION

1. Field of the Invention

The present invention relates to a design system for designing the shapes of the lenses of eyeglasses (hereinafter referred to as eyeglass lenses) and the shapes of the front rims of eyeglass frames.

2. Discussion of Related Art

In the industry of manufacturing eyeglass frames, eyeglass frames and the peripheral shape of eyeglass lenses to be fitted into the eyeglass frames have conventionally been designed without careful consideration of facial differences of individual consumers who wear the eyeglasses. Therefore, standardized eyeglasses having a uniform style have been manufactured on a large scale and distributed to consumers via retailers.

Each individual has unique facial features as well as the individual's own aesthetic sense and design preferences, and therefore, designing of eyeglasses should be carried out by taking into account of the facial features of each individual and his or her aesthetic sense. However, in the present circumstances, manufacturers and retailers of eyeglasses have only tried to satisfy consumers' needs by blindly providing numerous eyeglass frames of various designs and different sizes.

Accordingly, consumers are forced to select and purchase eyeglass lenses and frames uniformly designed for mass production, the designing of which is carried out without considering the facial features of individual consumers and their aesthetic senses.

The above problem is partly caused by the production system and the control system for machine tools used in the production system, which are designed for manufacturing uniform products at a low cost.

Accordingly, there remained a need for a design system for designing shapes of eyeglasses based on personal information of facial characteristics.

SUMMARY OF THE INVENTION

An object of the present invention is to provide an improved design system for designing shapes of eyeglass lenses and the front rims of eyeglass frames, in which the shapes are automatically designed based on the information of facial features of respective individuals and their desired design of eyeglasses.

Another object of the present invention is to convert design information into control data, and to transmit the control data to machine tools for grinding eyeglass lenses and for shaping rims of eyeglass frames.

Accordingly, in one aspect of the present invention, there is provided a design system for designing shapes of eyeglasses based on information of facial characteristics, which comprises means for inputting an image of the face of a person as image data, means for effecting image processing, such as color compensation and profile emphasis, on the image data, means for extracting feature points which represent the features of the profile of the face and the features of the hair, eyebrows, eyes, nose and mouth, means for setting a plurality of horizontal, vertical and inclined auxiliary lines and auxiliary points on the auxiliary lines based on the feature points, and means for determining anchor points of a Bézier curve which defines the shapes of the lenses and front frame of the eyeglasses.

In another aspect of the present invention, there is provided a design system of claim 2, wherein means for converting information regarding values of the Bézier curve representing the defined shapes into data composed of coordinate values in a polar coordinate system and means for transmitting the converted data to a machine tool are further provided.

In further aspect of the present invention, control points provided at anchor points of the Bézier curve are controlled based on words which represent a desired image for the eyeglasses.

BRIEF DESCRIPTION OF THE DRAWINGS

Various other objects, features and many of the attendant advantages of the present invention will be readily appreciated as they become better understood by reference to the following detailed description of the preferred embodiments when considered in connection with the accompanying drawings, in which.

DESCRIPTION OF THE INVENTION AND PREFERRED EMBODIMENTS

In the present invention, the image of the face of each person is first processed by image processing technology using a computer so that color compensation, profile emphasis, and the like are effected. After that, feature points representing facial features are extracted from the image. Based on the positions of the feature points, vertical, horizontal and inclined auxiliary lines and arbitrary auxiliary points on the auxiliary lines are set so as to obtain anchor points of a Bézier curve which will be described hereinafter. Using the anchor points corresponding to control points of the Bézier curve, a basic shape is generated for designing final shapes.

The peripheral shape of eyeglass lenses and the shape of the rim of an eyeglass frame are constituted by curved lines. By the use of a so-called Bezier curve, a curved line is freely formed by changing the positions of the anchor points and control points. A curve represented by a specific representation formula using parameters, and proposed by Bézier is known as Bézier curve.

The term "feature point" means an arbitrary point on the profile line of each of various portions in the captured image of a face, and the term "auxiliary point" means an intersection between auxiliary lines which are drawn from feature points or the like. Each of the feature points, auxiliary lines and auxiliary points is denoted either by a name composed of two letters of the alphabet or a combination of a letter and a numeral.

Figure 1:
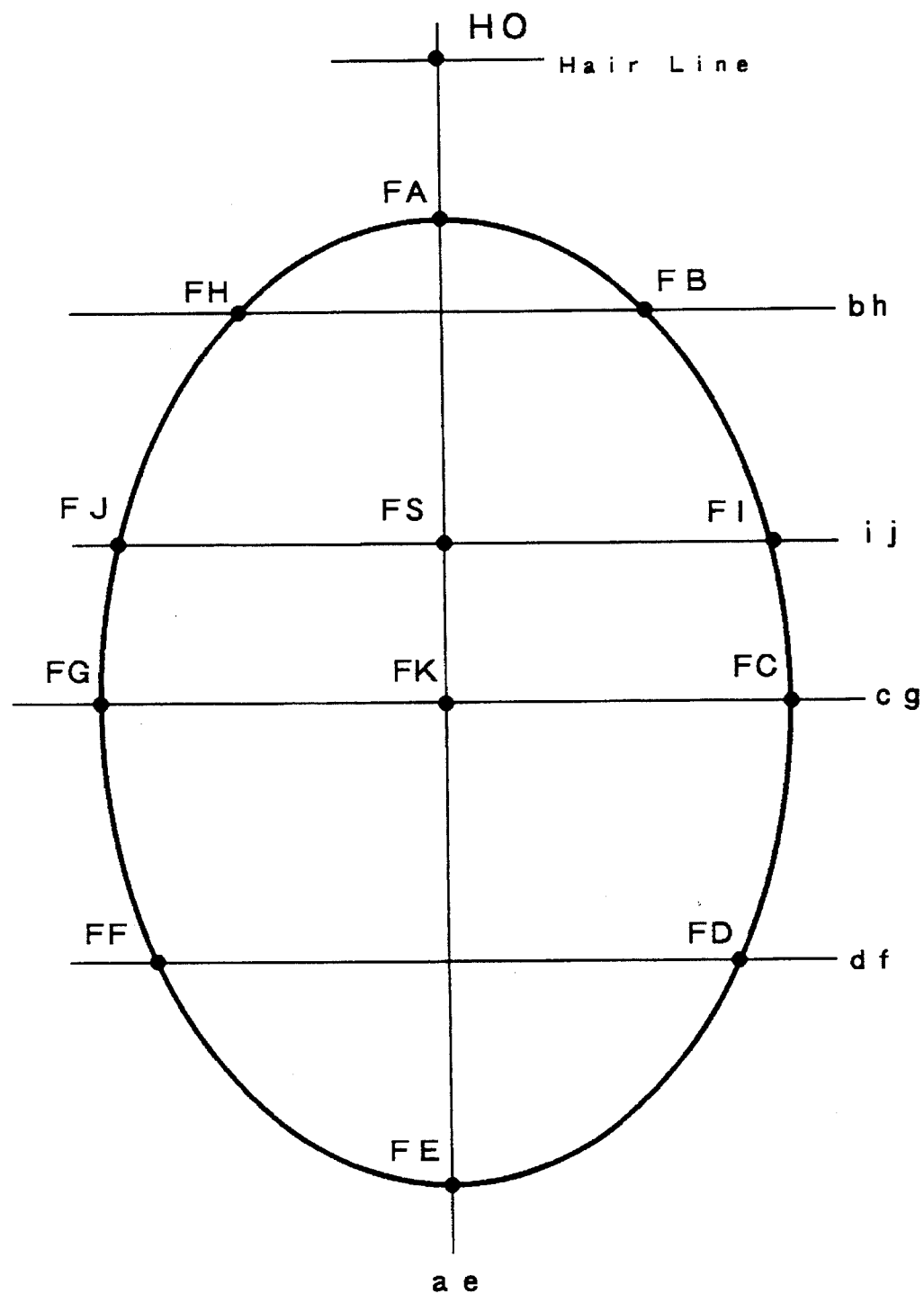
FIG. 1 is a chart showing a profile of a face and the positions of feature points at the center portion of the face which are required for designing eyeglass lenses and front rims of eyeglass frames in the present invention.

FIG. 1 shows the profile of a face and feature points, at the center portion thereof, which are necessary for designing eyeglass lenses and the front rim of an eyeglass frame. For the profile of the face, there are captured ten points which include points FA, FB and FH representing the features of the hairline, points FI, FC, FG and FJ representing the features of the area from the forehead to the cheek, and points FD, FE and FF representing the features of the chin.

Vertical auxiliary line ae connecting points FA and FE, horizontal auxiliary line ij connecting points FI and FJ, and horizontal auxiliary line cg connecting points FC and FG are drawn to form intersections located at the center portion of the face. These intersections are defined as auxiliary points FS and FK. For the features of the hair, there is defined a point H0 which is the intersection of a vertical line passing through the center portion of the face and a profile line representing the profile of the top portion of the hair.

Figure 2:
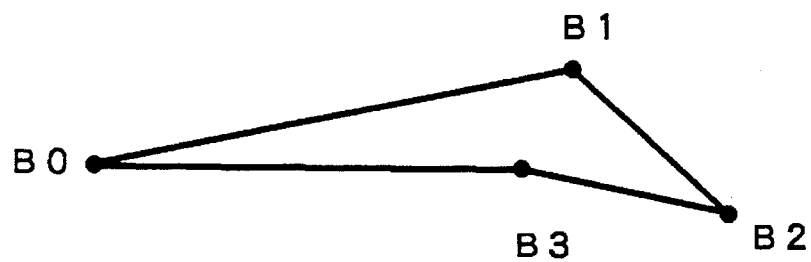
FIG. 2 is an explanatory chart for explaining the method of setting feature points representing the features of an eyebrow.

Next, there are obtained various feature points representing the features of various portions of the face such as the eyebrow, eye, nose and mouth. For the eyebrow, four points are captured as feature points, as shown in FIG. 2, including point B0 at the inner end of the eyebrow, point B1 at the top of the eyebrow, point B2 at the tail or outer end of the eyebrow, and point B3 representing the features of the area below the eyebrow.

Figure 3:
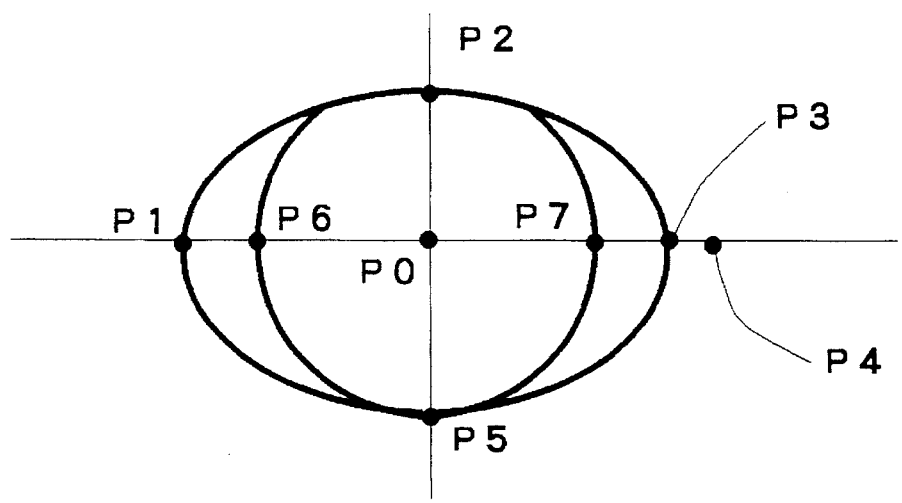
FIG. 3 is an explanatory chart for explaining the method of setting feature points representing the features of an eye.

For the eye, eight points are captured as feature points, as shown in FIG. 3, including point P0 at the center of the pupil, points P6, P7 on the profile line of the iris and points P1, P2, P3, P4 and P5 representing the features of the eyelid. The above definition of the feature points for the eye is used for the case in which an image is captured when the eye is opened.

Figure 4:
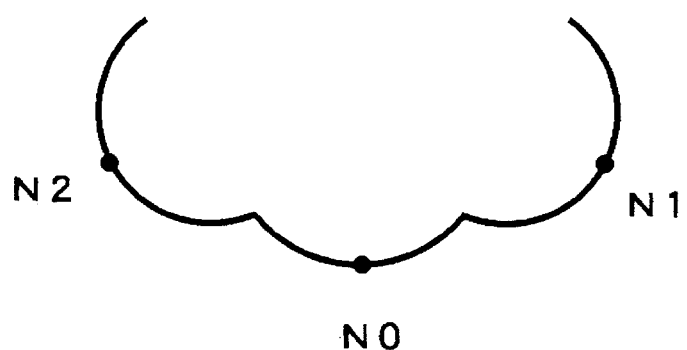
FIG. 4 is an explanatory chart for explaining the method of setting feature points representing the features of the nose.

For the nose, point N0 at the tip of the nose and points N1 and N2 at the peaks of the wings of the nose are captured as feature points, as shown FIG. 4.

Figure 5:
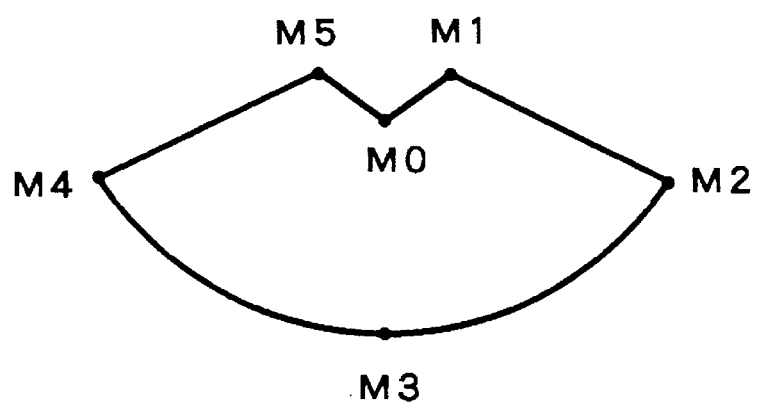
FIG. 5 is an explanatory chart for explaining the method of setting feature points representing the features of the mouth.

For the lips, six points are captured as feature points, as shown in FIG. 5, including points M0, M1 and M5 at the depressed center portion of the upper lip, points M2 and M4 at both ends of the lips, and point M3 at the lower end of the lower lip.

Based on the positions of these feature points, distances among the feature points are calculated, and auxiliary lines are drawn for setting anchor points of a Bezier curve which will be described hereinafter.

Figure 6:
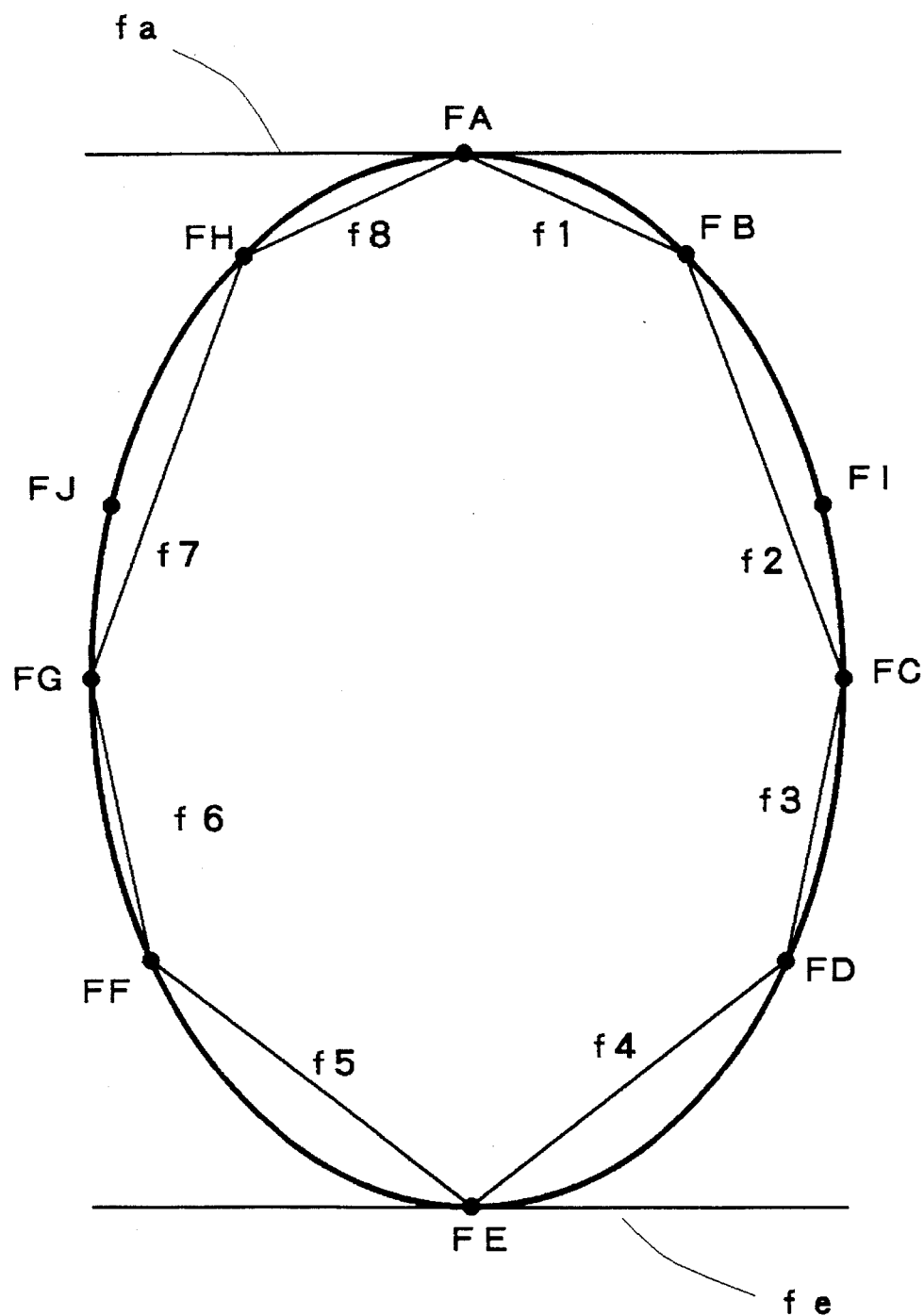
FIG. 6 is an explanatory chart for explaining the method of setting feature points representing the features of the profile line of a face.

As shown in FIG. 6, auxiliary lines f1, f2, f3, f4, f5, f6, f7 and f8 are drawn to successively connect the eight feature points (FI and FJ are excluded) among the feature points on the profile line of the face. Horizontal auxiliary line fa passing through feature point FA and auxiliary line fe passing through feature point FE are also drawn.

Figure 7:
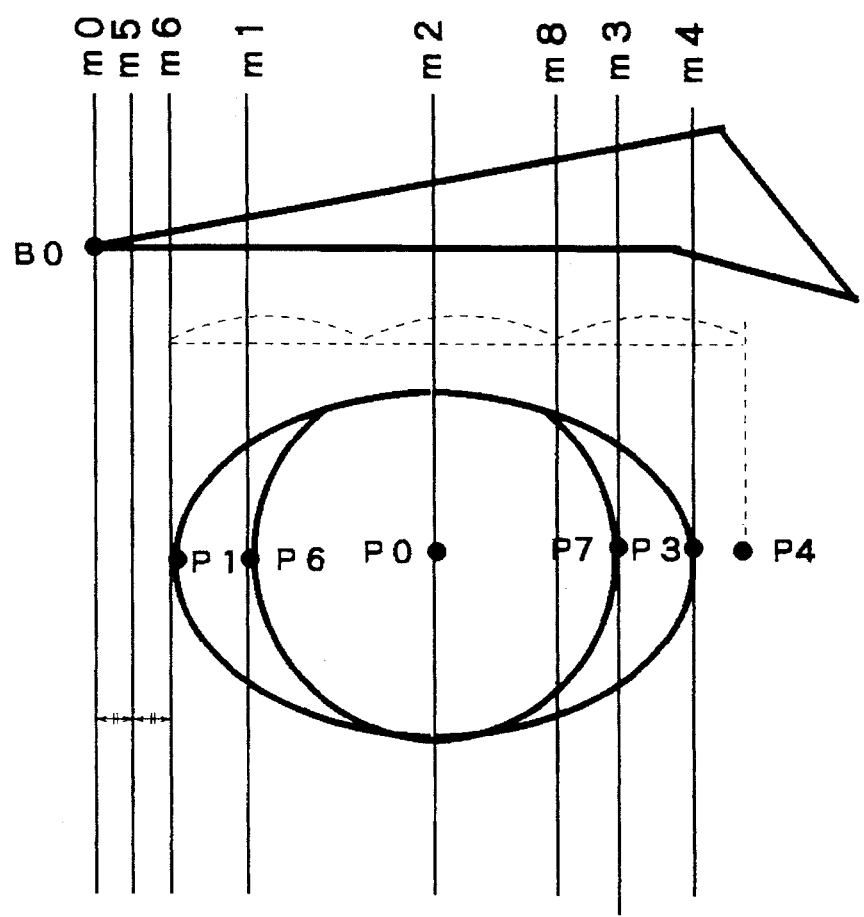
FIG. 7 is an explanatory chart showing vertical auxiliary lines drawn on the eyebrow and the eye.

As shown in FIG. 7, the following vertical auxiliary lines m1 through m8 are drawn on the eyebrow and the eye:

auxiliary line m0 is a vertical line passing through feature point B0 of the eyebrow;

auxiliary line m1 is a vertical line passing through feature point P6 at the innermost edge of the iris;

auxiliary line m2 is a vertical line passing through feature point P0 at the center of the pupil;

auxiliary line m3 is a vertical line passing through feature point P7 at the outermost edge of the iris;

auxiliary line m4 is a vertical line passing through feature point P3 at the outermost edge of the white of the eye;

auxiliary line m5 is a vertical line passing through a point obtained by dividing the horizontal distance between feature point B0 of the eyebrow and feature point P1 at the inner end of the eye in half;

auxiliary line m6 is a vertical line passing through feature point P1 at the innermost edge of the white of the eye; and auxiliary line m8 is a vertical line passing through a point lying ⅔ of the horizontal distance from point P1 to point P4.

Figure 8:
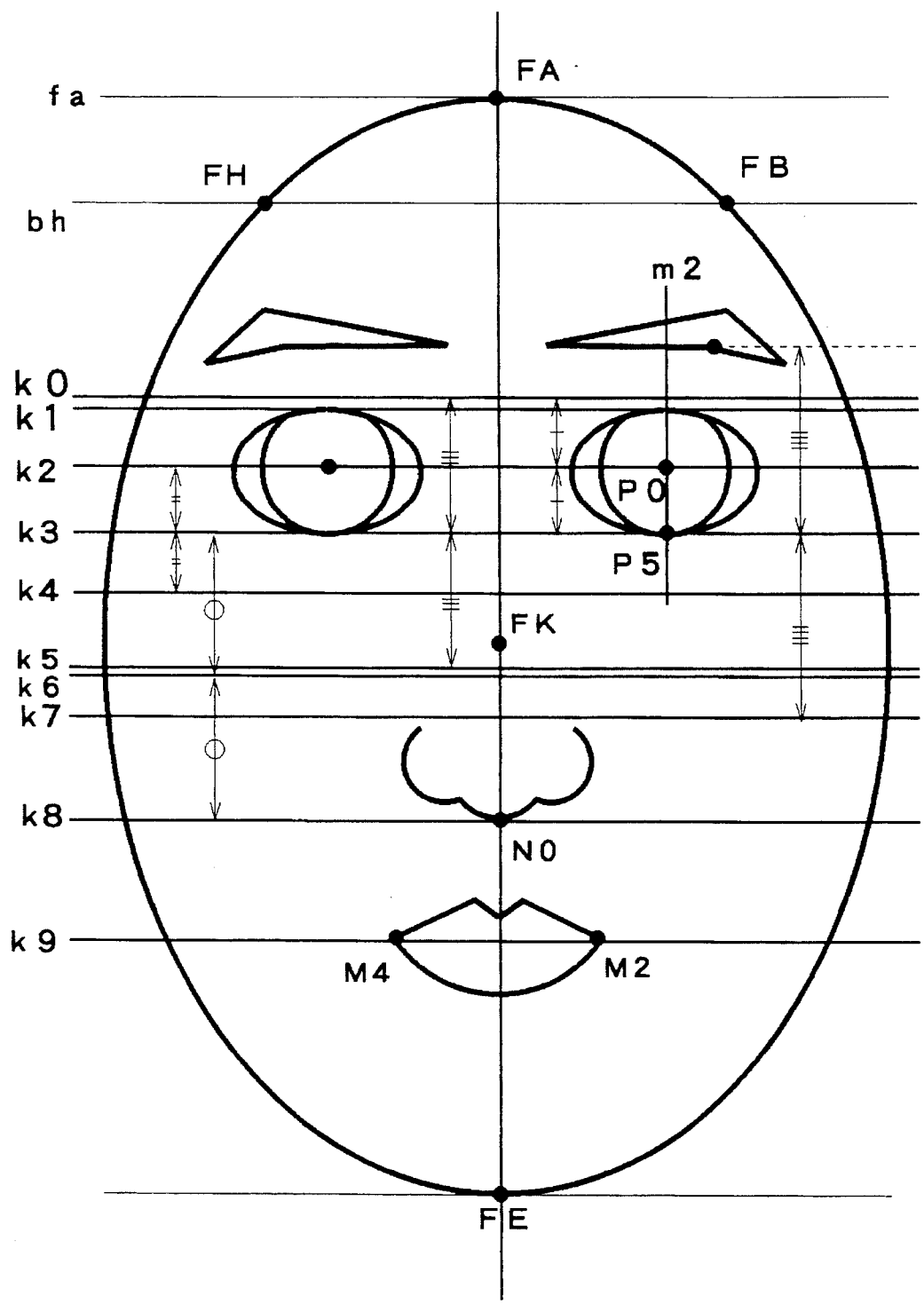
FIG. 8 is an explanatory chart showing horizontal auxiliary lines.

As shown in FIG. 8, the following horizontal auxiliary lines k0 through k9 are drawn:

auxiliary line k0 is a horizontal line passing through a position which is located above feature point P0 by an amount equal to the vertical distance, along auxiliary line m2, between feature points P0 and P5 of the eye;

auxiliary line k1 is a horizontal line passing through feature point P2 of the eye;

auxiliary line k2 is a horizontal line passing through feature point P0 of the eye;

auxiliary line k3 is a horizontal line connecting feature points P5 of the right and left eyes;

auxiliary line k4 is a horizontal line passing through a position which is located below auxiliary line k3 by an amount equal to the vertical distance between horizontal lines k3 and k2;

auxiliary line k5 is a horizontal line passing through a position which is located below auxiliary line k3 by an amount equal to the vertical distance between horizontal lines k3 and k0;

auxiliary line k7 is a horizontal line passing through a position which is located below auxiliary line k3 connecting the feature points of the lower eyelids by an amount equal to the vertical distance between horizontal line k3 and feature point B3 of the eyebrow;

auxiliary line K8 is a horizontal line passing through feature point N0 at the tip of the nose;

auxiliary line K9 is a horizontal line connecting feature point M2 at the right end of the lips and feature point M4 at the left end of the lips; and auxiliary line k6 is a horizontal line which is located at the vertically center position between auxiliary line k3 connecting the centers of the pupils and auxiliary line k8 passing through the feature point at the tip of the nose.

Figure 9:
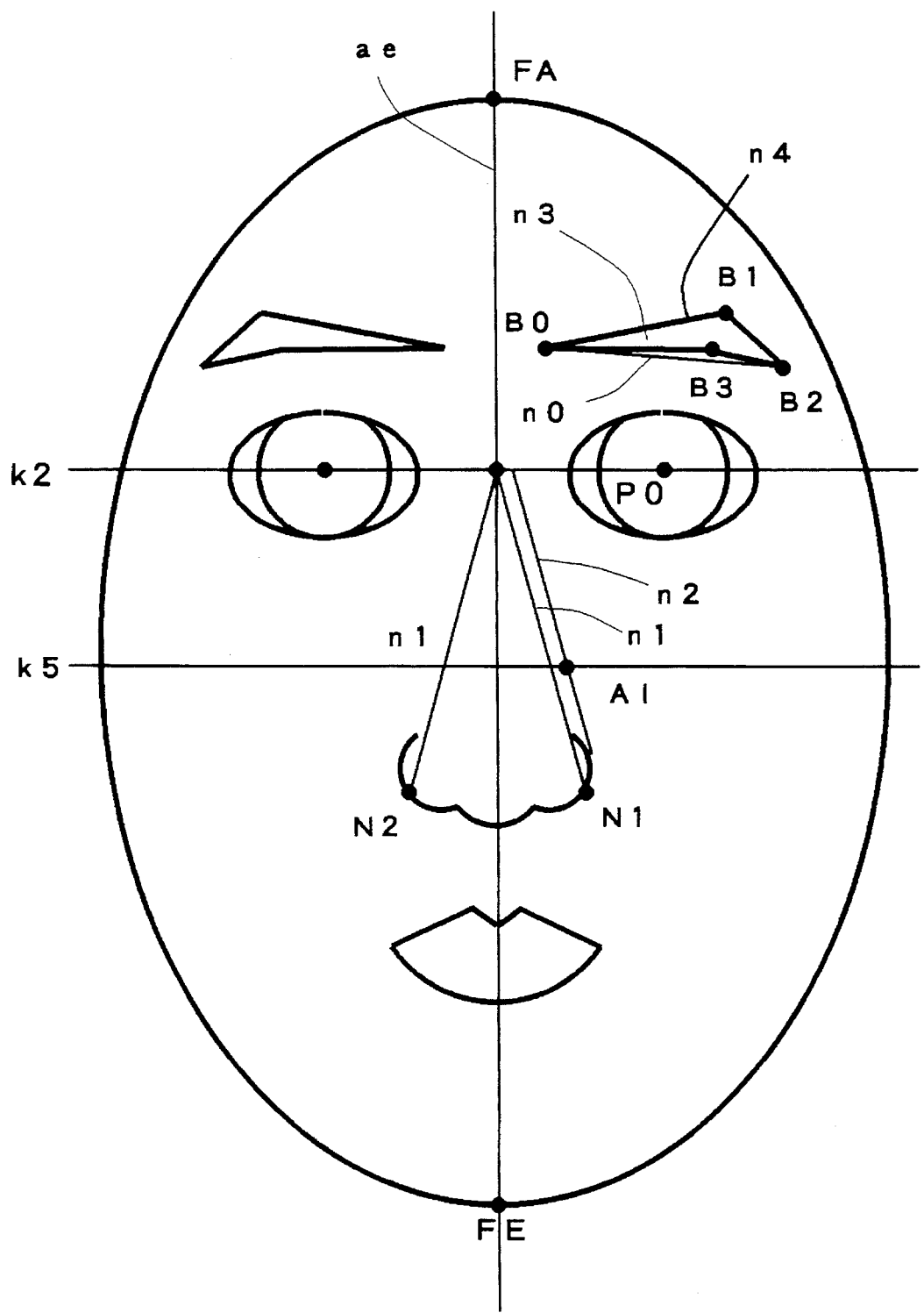
FIG. 9 is an explanatory chart showing inclined auxiliary lines.

As shown in FIG. 9, the following inclined auxiliary lines n0 through n4 are drawn:

auxiliary line n0 is a line connecting feature point B0 at the inner end of the eyebrow and feature point B2 at the outer end of the eyebrow;

auxiliary lines n1 are lines drawn from the intersection FS of horizontal auxiliary line k2 and the center vertical line ae toward feature points N1 and N2 of the nose;

auxiliary line n2 is a line which is parallel to auxiliary line n1 and passes through anchor point AI which will be described hereinafter;

auxiliary line n3 is a line connecting feature points B0 and B3 of each eyebrow; and auxiliary line n4 is a line connecting feature points B0 and B1 of each eyebrow.

Figure 10:
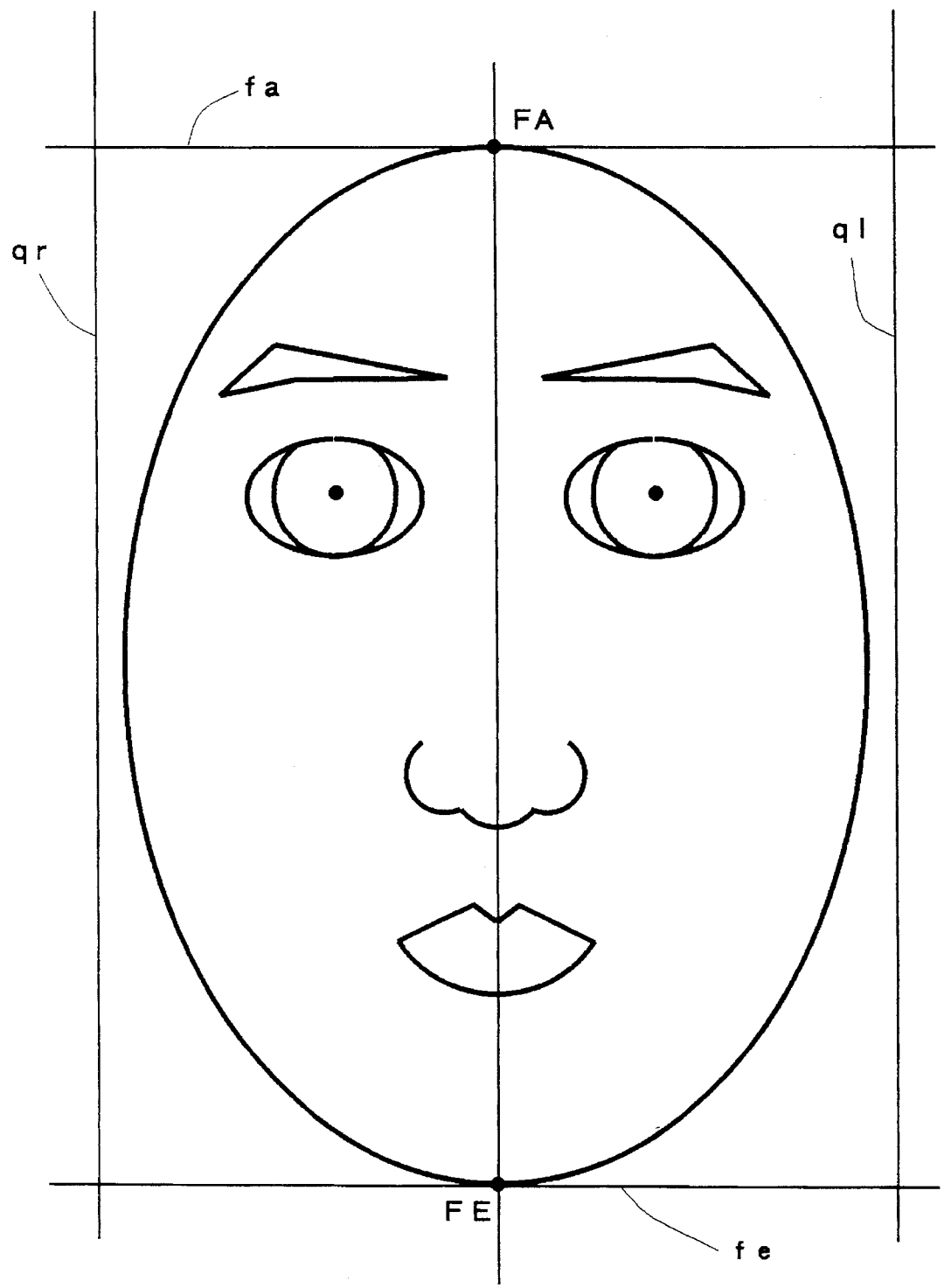
FIG. 10 is an explanatory chart showing auxiliary lines which restrict the shapes of lenses and rims.

As shown in FIG. 10, auxiliary lines qr and ql are drawn for restricting the shapes of the lenses and the rim of the eyeglass frame. These lines restrict the maximum horizontal width of the lenses and the rim of the eyeglass frame, and perpendicularly intersect horizontal line fa passing through feature point FA and horizontal line fe passing through feature point FE. Auxiliary line qr is a vertical line located on the right side of the face, while auxiliary line ql is a vertical line located on the left side of the face.

The positions of auxiliary lines qr and ql in the horizontal direction vary depending on the vertical distance between feature points FA and FE of the face.

If the horizontal distance between lines qr and ql is defined as x and the vertical distance between feature points FA and FE is defined as y, then x is in the range of from y/1,414 to y/1,613. The values of x and y within this range are determined based on the results of judgment regarding the types of faces which will be described hereinafter.

Auxiliary lines fa, fe and qr, ql are collectively referred to as basic face lines.

Next, by using the feature points and the auxiliary lines determined based on the feature points, control points of a Bezier curve, i.e., anchor points and auxiliary points are determined for drawing shapes of lenses and the rim of an eyeglass frame.

The positional relationships between anchor points and auxiliary points, which are used for controlling the Bézier curve, and the feature points of the face are determined as follows. Here, each of the anchor points is referred to by a name composed of letters of the alphabet. The anchor points are hereinafter defined with the assumption that the same definition is used for the right and left halves of the face.

Figure 11:
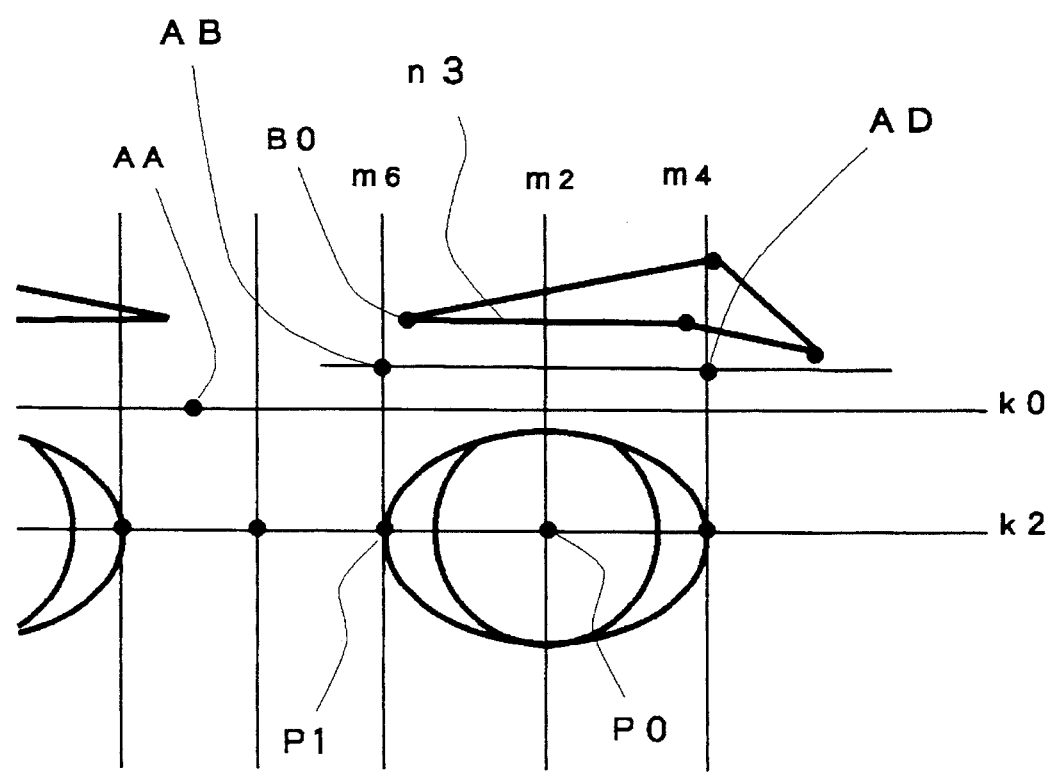
FIGS. 11, 12, 13, 14, 15 and 16 are explanatory charts showing the method of setting anchor points.

As shown in FIG. 11, anchor points AA are on auxiliary line k0 and are located at positions apart in the rightward and leftward directions from the center vertical line of the face by a distance obtained by multiplying the distance between feature points P1, i.e., the distance between the inner ends of the eyes by a constant value.

Subsequently, anchor points AB and AD are set as follows according to the inclination of auxiliary line n3 with respect to the horizontal.

(1) In the case where the angle between auxiliary line n3 and the horizontal is smaller than a predetermined angle and feature point P1 of the eye is closer to the center of the face than feature point B0 of the eyebrow, as shown in FIG. 11, anchor point AB is set at a position located at auxiliary line m6 and below feature point B0 of the eyebrow by a predetermined amount, and anchor point AD is set at the intersection of auxiliary line m4 and a line drawn from anchor point AB parallel to auxiliary line n3.

Figure 12:
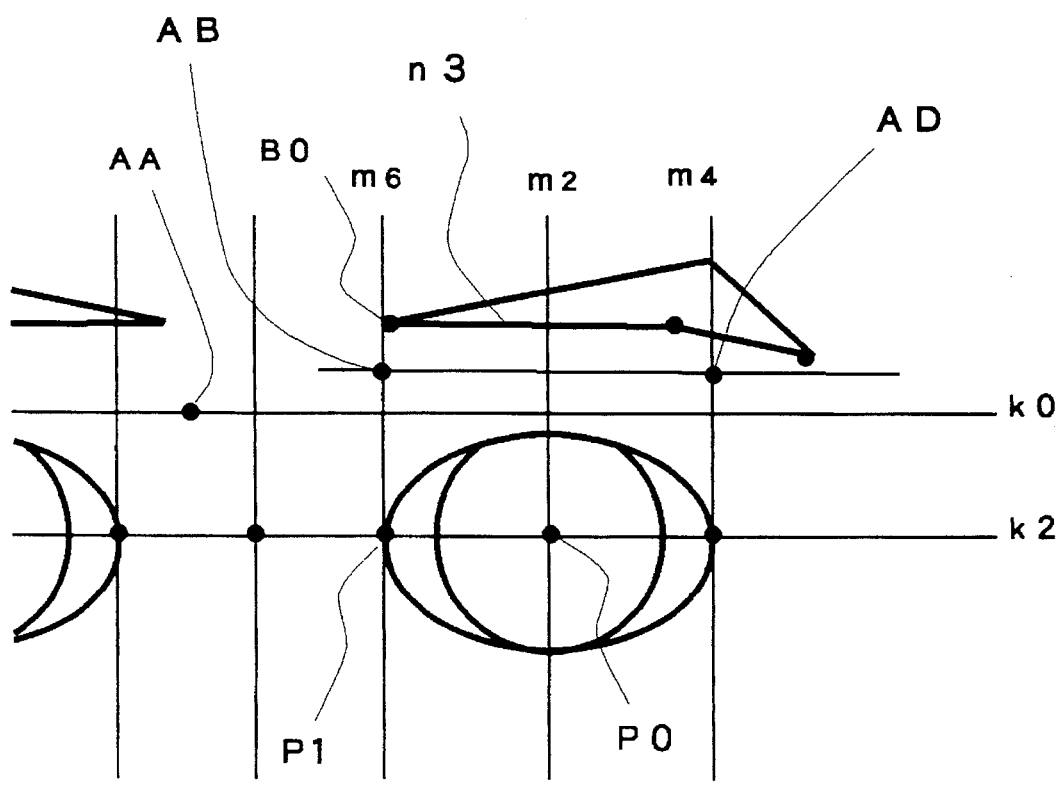

In the case where feature points P1 and B0 share the same horizontal position while other conditions are the same, as shown in FIG. 12, anchor point AB is set at a position located at auxiliary line m5 and below feature point B0 of the eyebrow by a predetermined distance, and anchor point AD is set at the intersection of auxiliary line m4 and a line drawn from anchor point AB parallel to auxiliary line n3.

Figure 13:
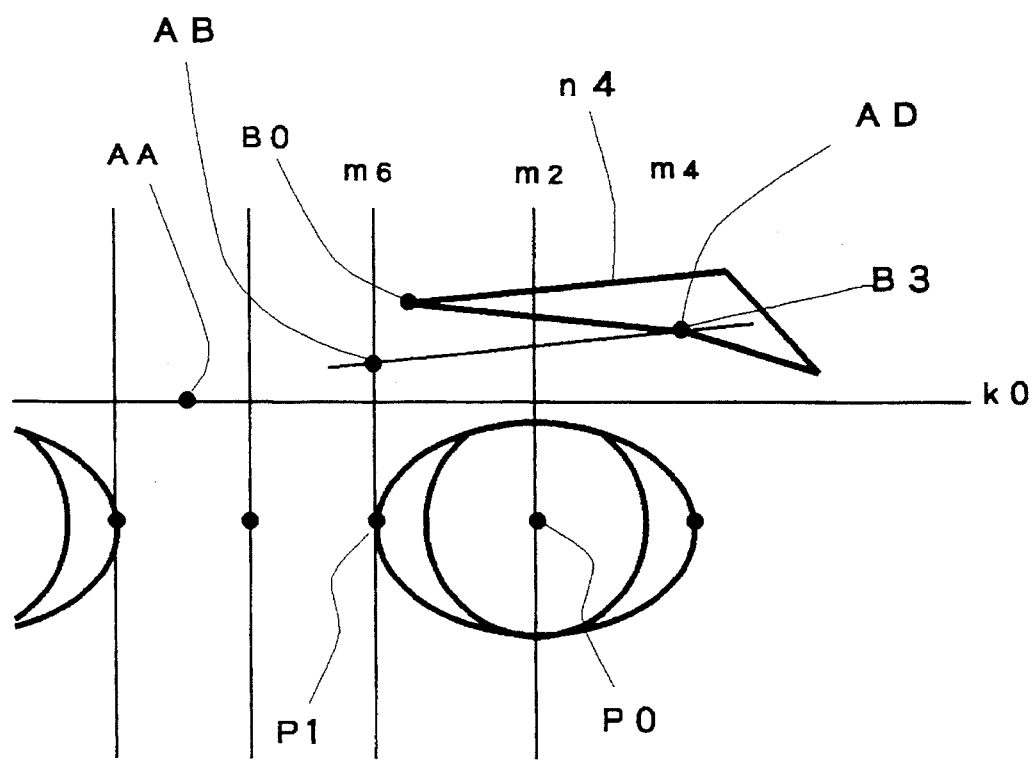

(2) In the case where the angle between auxiliary line n3 and the horizontal is greater than the predetermined angle and feature point P1 of the eye is closer to the center of the face than feature point B0 of the eyebrow, as shown in FIG. 13, anchor point AD is set at feature point B3, and anchor point AB is set at the intersection of auxiliary line m6 and a line drawn from anchor point AD parallel to auxiliary line n4.

Figure 14:
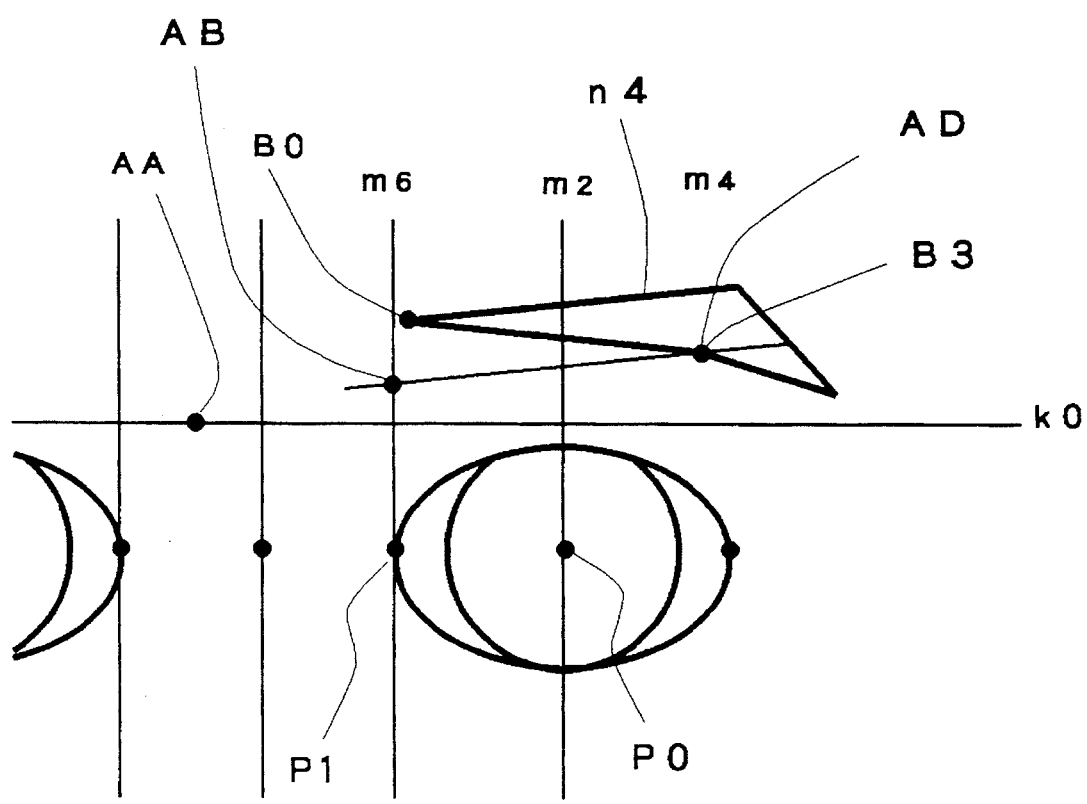

In the case where feature points P1 and B0 share the same horizontal position while other conditions are the same, as shown in FIG. 14, anchor point AD is set at feature point B3, and anchor point AB is set at the intersection of auxiliary line m5 and a line drawn from anchor point AD parallel to auxiliary line n4.

The positions of anchor points AE and AF are determined based on the results of the classification of faces, which is carried out by measuring relative distances among feature points on the above-mentioned profile line of the face, by the positions of basic face lines defined by auxiliary lines qr and ql; and by the sex of the person for whom a design is being carried out.

Facial types are classified into round types, long rectangular types, rectangular types, reverse triangle types, diamond types, full-cheeked types, long types and lemon types based on the relative distances among feature points on the profile line of the face.

For each of the classified facial types, anchor points AE and AF are set at the intersections of a horizontal auxiliary line and an arc which will be described below.

First, the radius RA of a first arc is determined to be equal to the horizontal distance between the center vertical line ae and auxiliary lines qr and ql.

Next, the radius RB of a second arc is determined to be equal to a horizontal distance which is obtained by adding the distance between feature points P0 at the centers of the right and left pupils to the horizontal distance between the center vertical line ae and auxiliary lines qr and ql.

Figure 15:
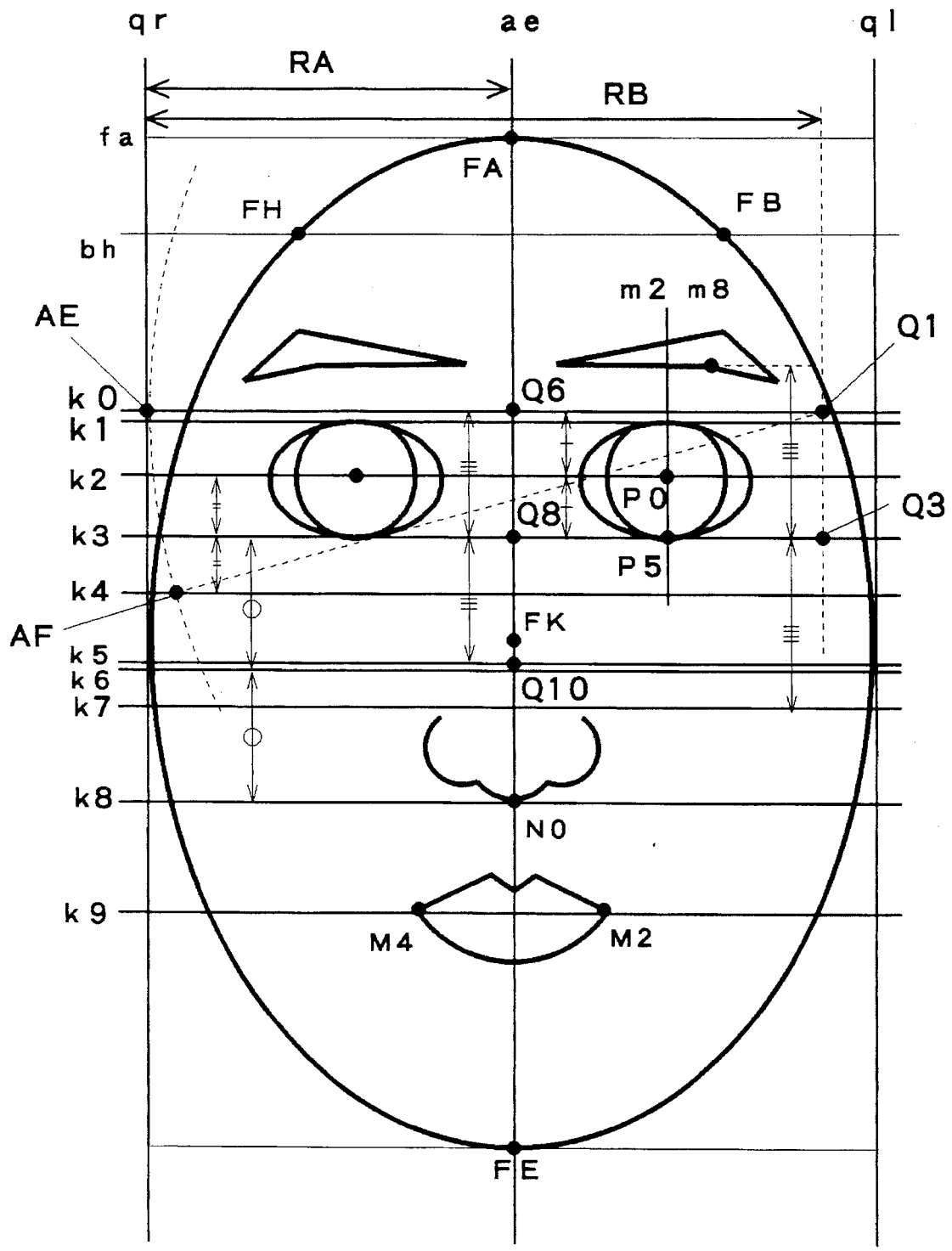

Further, the center positions of the above-mentioned two kinds of arcs, which are shown in FIG. 15, are defined as follows:

center position Q1 is a point which is on auxiliary line k0 and is spaced from qr or ql by the radius RB;

center position Q3 is a point which is on auxiliary line k3 and is spaced from qr or ql by the radius RB;

center position Q6 is a point which is on auxiliary line k0 and is spaced from qr or ql by the radius RA;

center position Q8 is a point which is on auxiliary line k3 and is spaced from qr or ql by the radius RA; and center position Q10 is a point which is on auxiliary line k5 and is spaced from qr or ql by the radius RA.

Anchor points AE and AF are determined for respective combinations of facial types and sexes as follows.

Anchor points AE for a man or woman having a round face are the intersections of auxiliary line k0 and auxiliary lines qr and ql, and anchor points AE are the intersections of auxiliary line k4 and an arc of the radius RB whose center is located at the center position Q1, as shown in FIG. 15.

Anchor points AE for a man having a long rectangular face are the intersections of auxiliary line k0 and an arc of the radius RB having a center located at the center position Q3, and anchor points AF are the intersections of auxiliary line k4 and auxiliary lines qr and ql.

Anchor points AE for a woman having a long rectangular face are the intersections of auxiliary line k0 and an arc of the radius RA having a center located at the center position Q8, and anchor points AF are the intersections of auxiliary line k4 and auxiliary lines qr and ql.

Anchor points AE for a man having a rectangular face are the intersections of auxiliary line k0 and the arc of the radius RB centered at the center position Q3, and anchor points AF are the intersections of auxiliary line k4 and auxiliary lines qr and ql.

Anchor points AE for a woman having a rectangular face are the intersections of auxiliary line k0 and the arc of the radius RA centered at the center position Q8, and anchor points AF are the intersections of auxiliary line k4 and auxiliary lines qr and ql.

Anchor points AE for a man or woman having a reverse triangle face are the intersections of auxiliary line k0 and an arc of the radius RA centered at the center position Q10, and anchor points AF are the intersections of auxiliary line k5 and auxiliary lines qr and ql.

Anchor points AE for a man or woman having a diamond face are the intersections of auxiliary line k0 and auxiliary lines qr and ql, and anchor points AF are the intersections of auxiliary line k4 and auxiliary lines qr and ql.

Anchor points AE for a man or woman having a full-cheeked face are the intersections of auxiliary line k0 and an arc of the radius RB centered at the center position Q3, and anchor points AF are the intersections of auxiliary line k4 and an arc of the radius RA centered at center position Q6.

Anchor points AE for a man or woman having a long face are the intersections of auxiliary line k0 and an arc of the radius RB centered at the center position Q3, and anchor points AF are the intersections of auxiliary line k4 and auxiliary lines qr and ql.

Anchor points AE for a man or woman having a lemon-like face are the intersections of auxiliary line k0 and an arc of the radius RB centered at the center position Q3, and anchor points AF are the intersections of auxiliary line k4 and auxiliary lines qr and ql.

Figure 16:
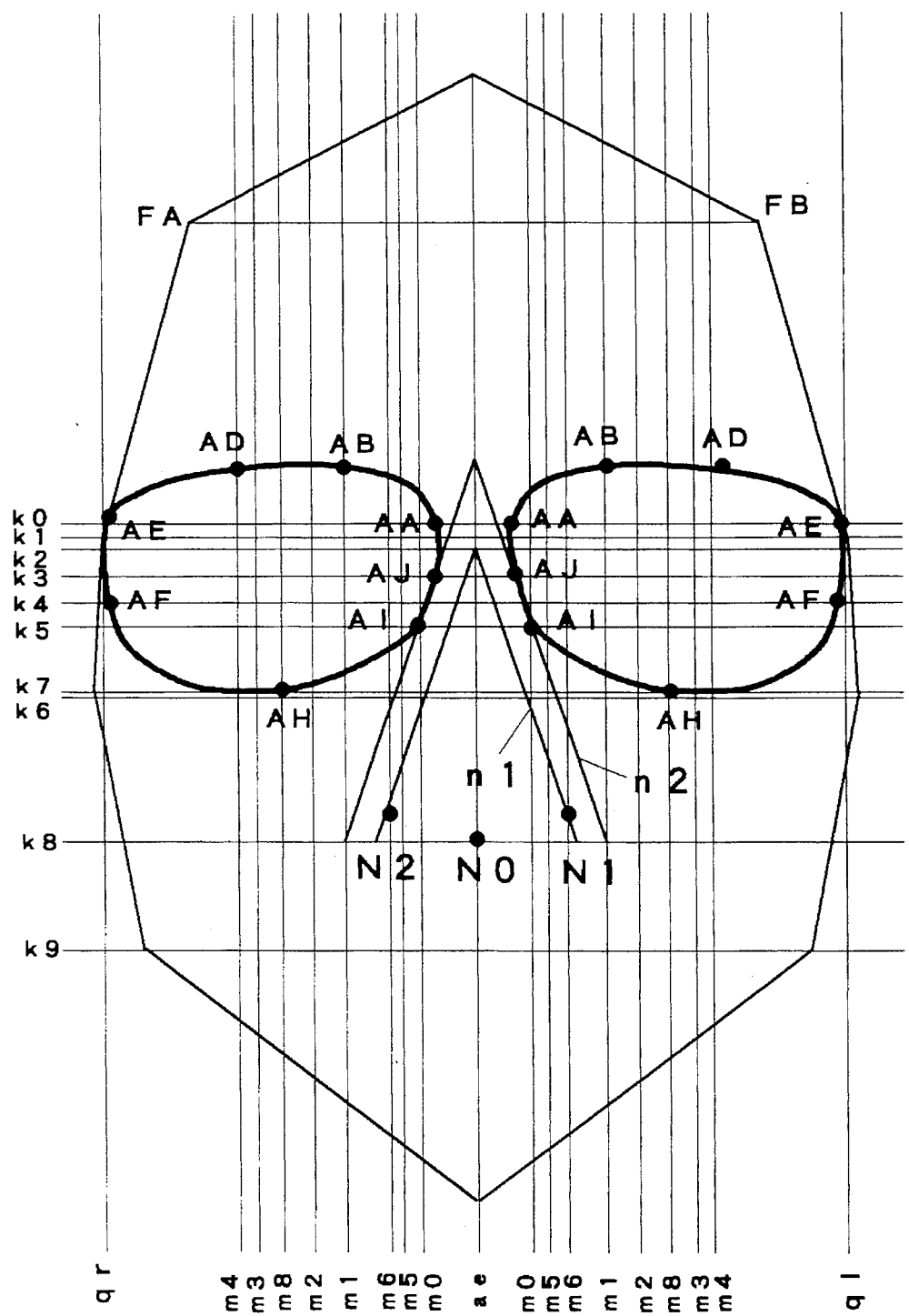

As shown in FIG. 16, anchor points AH are placed at the intersections of vertical auxiliary lines m8 and horizontal auxiliary line k7 or are placed at the intersections of vertical auxiliary lines m8 and horizontal auxiliary line k6.

Anchor points AI are placed on horizontal auxiliary line k5 of the face and spaced from the center vertical line of the face by a distance which is obtained by multiplying the distance between feature points N1 and N2, i.e., the width of the nostrils of the nose by a predetermined value.

Anchor points AJ are placed at the intersections of horizontal auxiliary line k3 and auxiliary lines n2 which are drawn from anchor points AI parallel to auxiliary lines n1.

The vertical and horizontal distances between these anchor points are restricted by the distances between feature points AE and AF, and the horizontal and vertical distances between the feature points of the various portions of the face, such as the eye and mouth.

For each of the anchor points of the Bézier curves, which have been selected in the above-mentioned manner, a control point is determined in the following manner for controlling the curvature at each anchor point.

In the following description, the distance between an anchor point and a control point is referred to as the "length of a whisker" of the Bézier curve.

The length of a whisker of the Bézier curve, or the distance between an anchor point and a control point, is made to correspond to about sixty words including "soft", "sharp" etc. which are conventionally used for expressing a desired image which is to be considered in designing the shape of eyeglasses. The lengths of the whisker are classified based on the predetermined classification which is common to all the anchor points. Accordingly, the length of each whisker of the Béier curve can be varied based on words expressing a desired image possessed by the person for whom eyeglasses are being designed so that a shape can be generated in accordance with the image expressed by the words.

The maximum length of each whisker of the Béier curve is a distance up to the intersection of a tangential line drawn from each anchor point. Further, the length of each whisker at each anchor point is adjusted using the following equation:

Length of whisker=Maximum length×Multiplying coefficient, where the multiplying coefficient is independently determined for each of the above-mentioned classifications. In the above-calculation, different groups of multiplying coefficients are prepared and selectively used for the respective anchor points. The multiplying coefficients are also varied based on the sex of the person for whom eyeglasses are being designed.

The direction of a whisker at each anchor point is basically the tangential direction with respect to the shapes of lenses and a rim to be generated, and is approximately expressed by a line perpendicular to a line which divides the angle of the curve at each anchor point into two equal parts. However, the direction of each whisker is changed and adjusted based on the sex of the person for whom eyeglasses are being designed in a similar manner as that used in determining the length of each whisker. For example, the direction of the whisker at anchor point AA is determined to be vertical when the person is a man. The direction of the whisker at anchor point AA is determined to coincide with a normal line passing through feature point P0 of the eye when the person is a woman.

Designs are made by the above-described procedure. Here, it is to be noted that information expressing the designs are generated as a function of a Bézier curve. Such information, however, is not convenient for controlling a grinding machine for grinding lenses, or a shaping machine for shaping the rim of an eyeglass frame.

Machine tools are generally controlled using information composed of polar coordinates. In the case of grinding eyeglass lenses and shaping rims, cutting tools, grinding wheels and cams are generally controlled in accordance with information composed of polar coordinates of two or three dimensions. Therefore, it is preferable that the values of the Béier curve which have been obtained in the above-mentioned procedure, be converted to polar coordinates, and are transmitted to machine tools. This facilitates control of the machine tools.

In the present invention, the values of the Béier curve are converted to values representing radial distances from the center of the boxing system of an eyeglass frame, or feature point P0 at the center of the pupil. Thus obtained values are transmitted to machine tools as polar coordinates so as to machine lenses and eyeglass frames into desired shapes.

Figure 17:
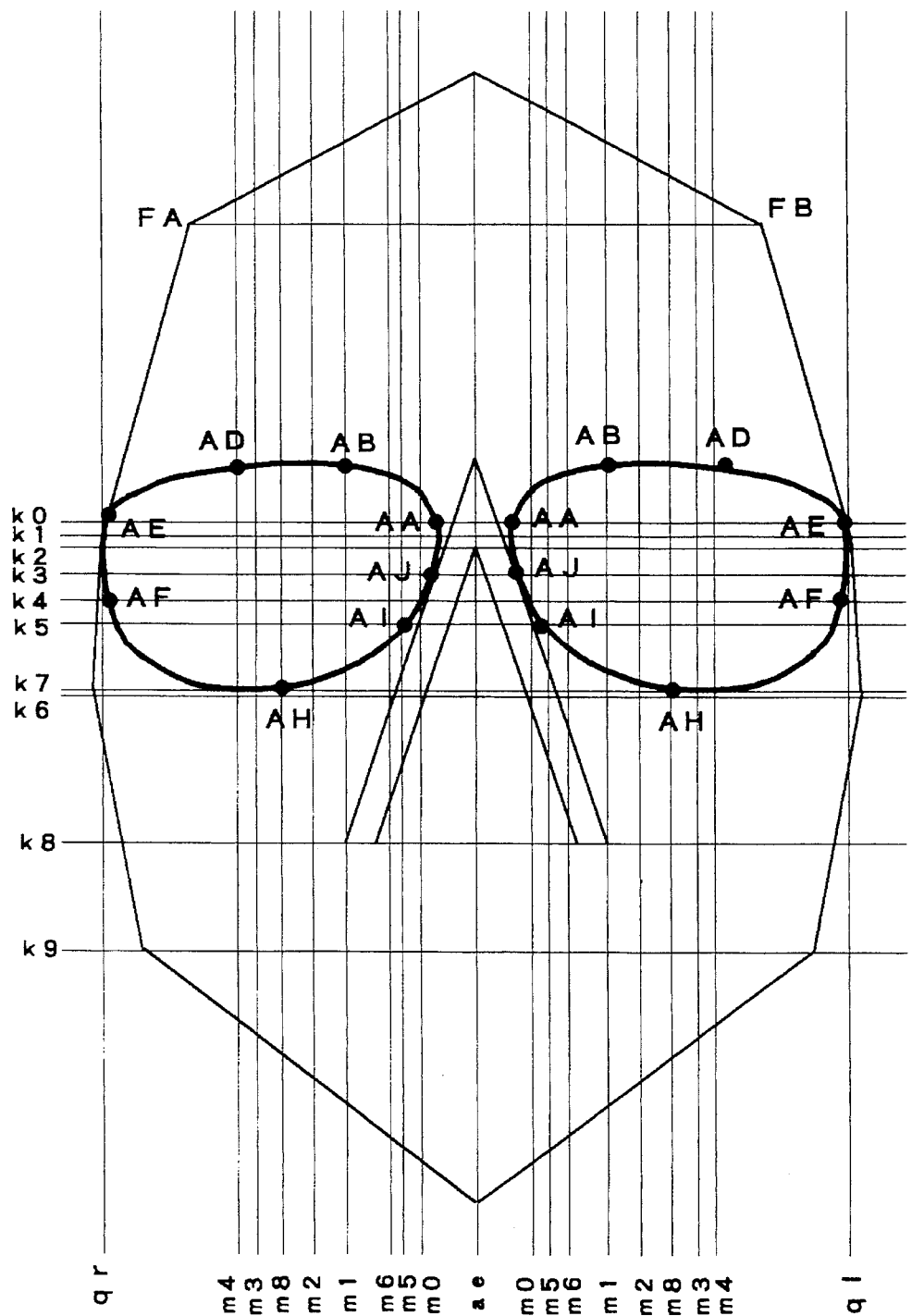
FIGS. 17, 18, 19, 20 and 21 are examples of eyeglasses designed by a design system according to an embodiment of the present invention.
Figure 18:
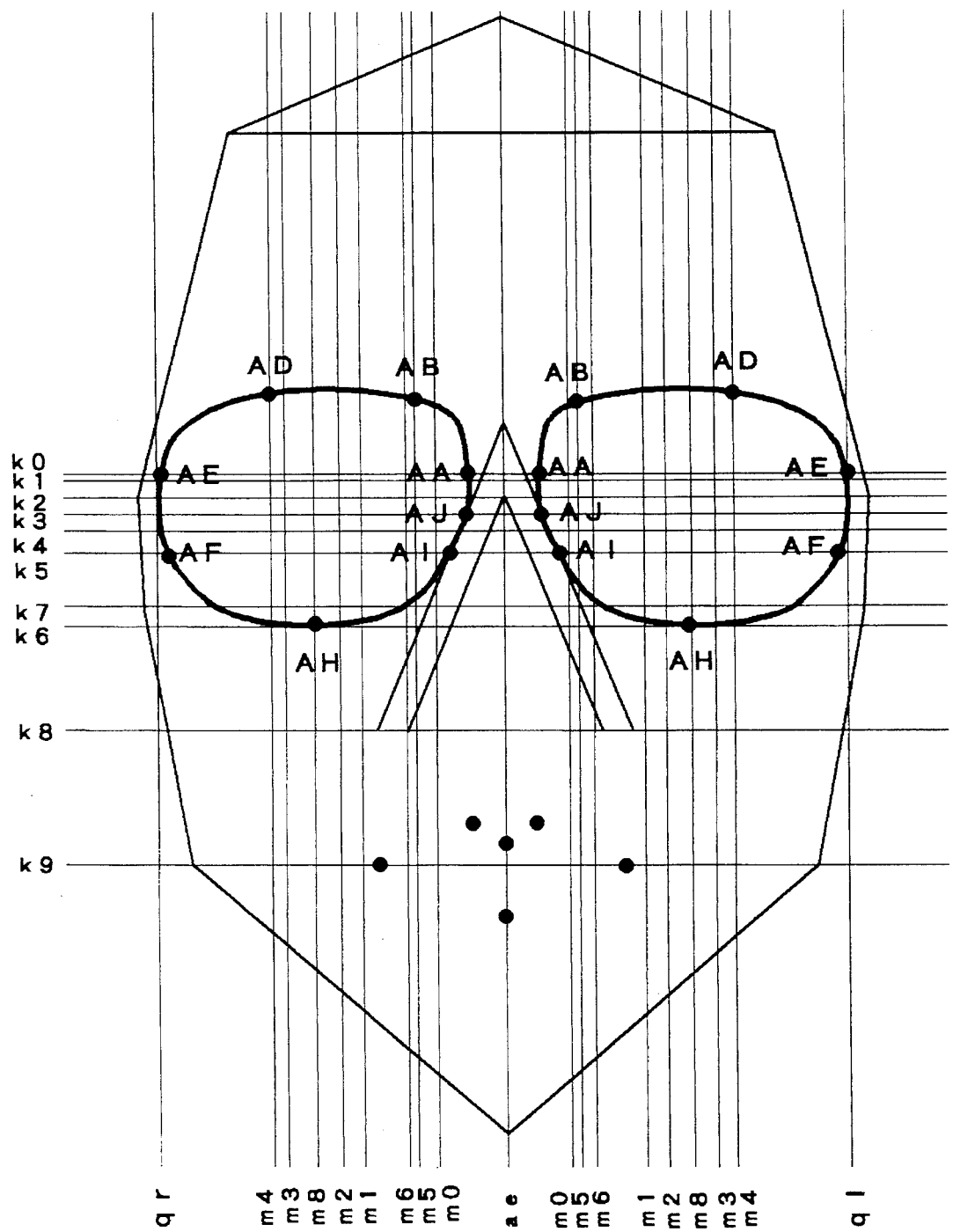

Examples of eyeglasses which are designed by the above-described method are shown in FIG. 17 through FIG. 21. FIG. 17 shows the shape of eyeglasses designed for a specific woman, FIG. 18 shows the shape of eyeglasses designed for a specific man. As is apparent from FIG. 17 and FIG. 18, different designs are generated for different persons because the positions of feature points differ from person to person, and each person selects different words which express a desired image for the eyeglasses.

Figure 19:
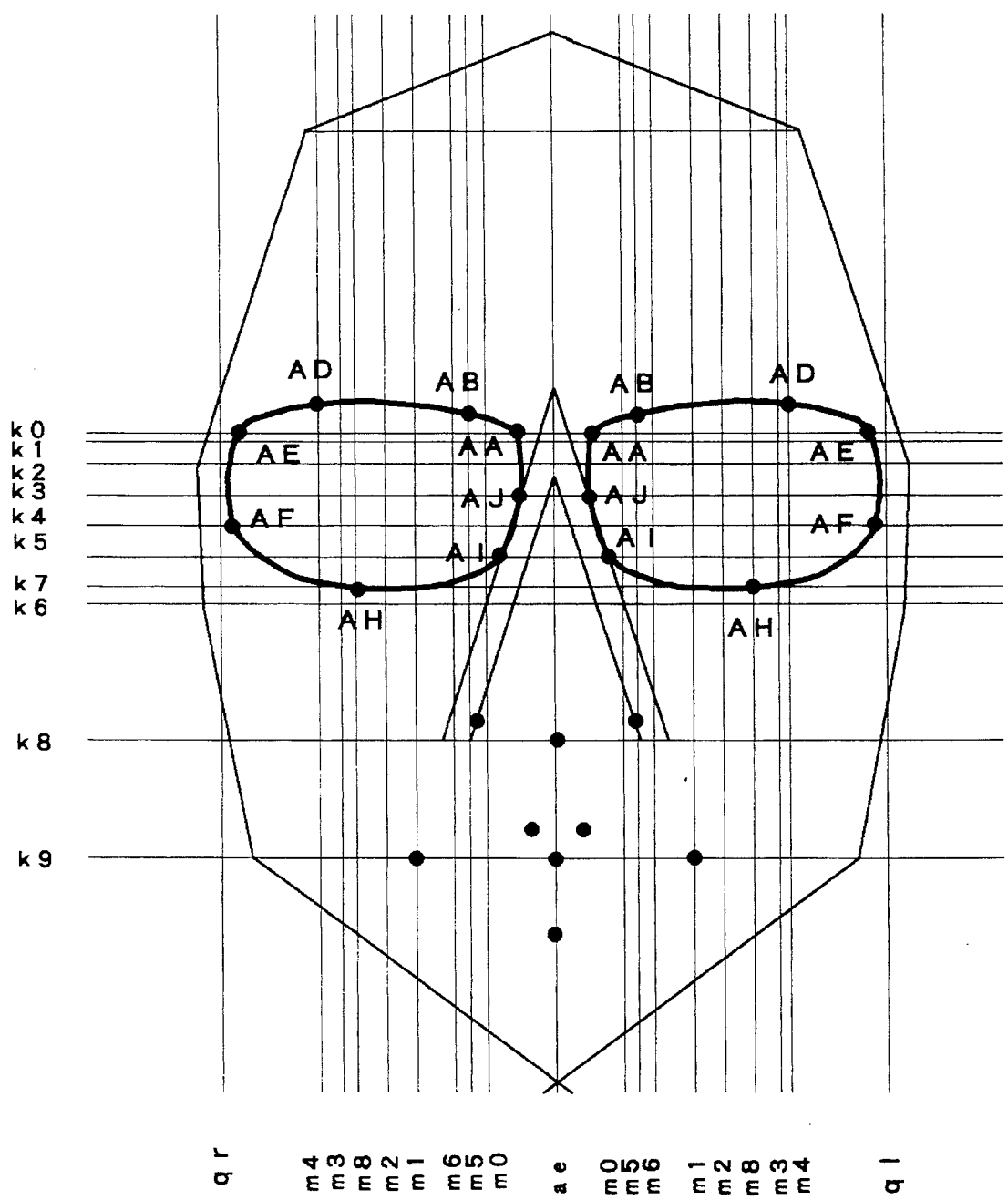
Figure 20:
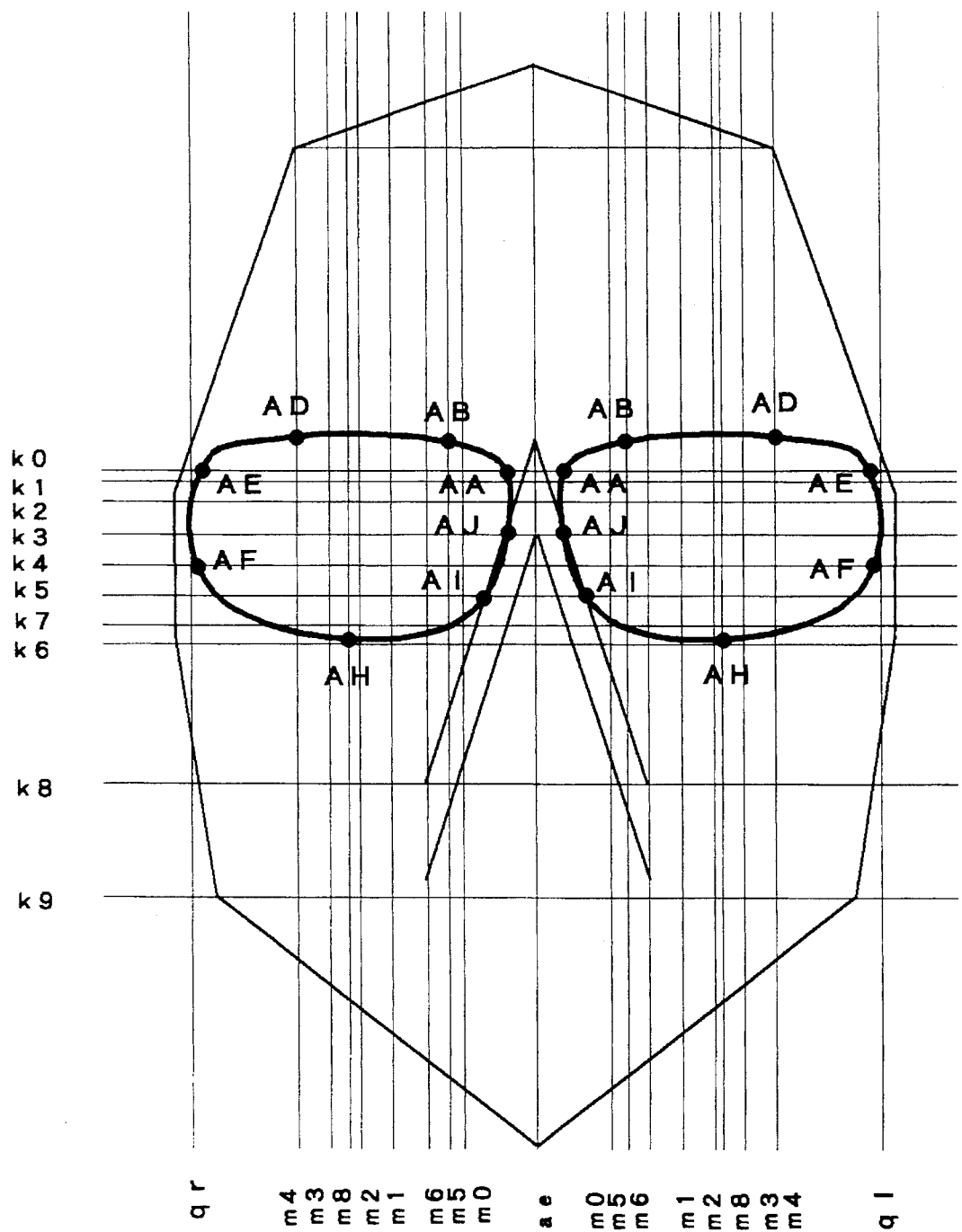
Figure 21:
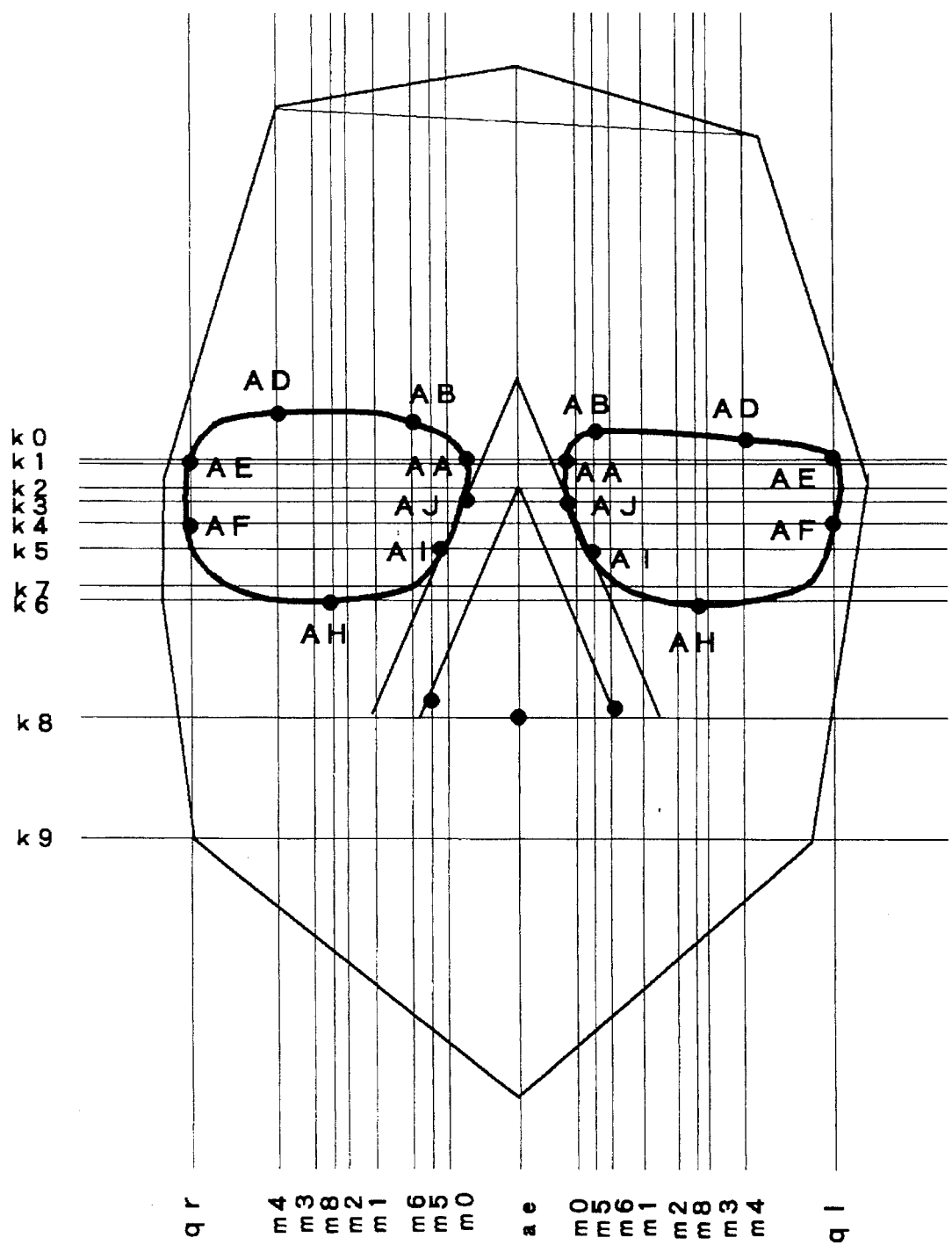

FIG. 19 and FIG. 20 show the shapes of eyeglasses which are designed for the same woman. These figures show that the shape of eyeglasses changes when different words are selected for expressing an image of the eyeglasses. The curvatures at the anchor points shown in FIG. 19 are different from those shown in FIG. 20. For example, the lines between anchor points AE and AF are almost straight in the design shown in FIG. 19, while the lines are bulged in the design shown in FIG. 20. FIG. 21 shows a different design in which the right half of an eyeglass frame is different form the left half.

Figure 22:
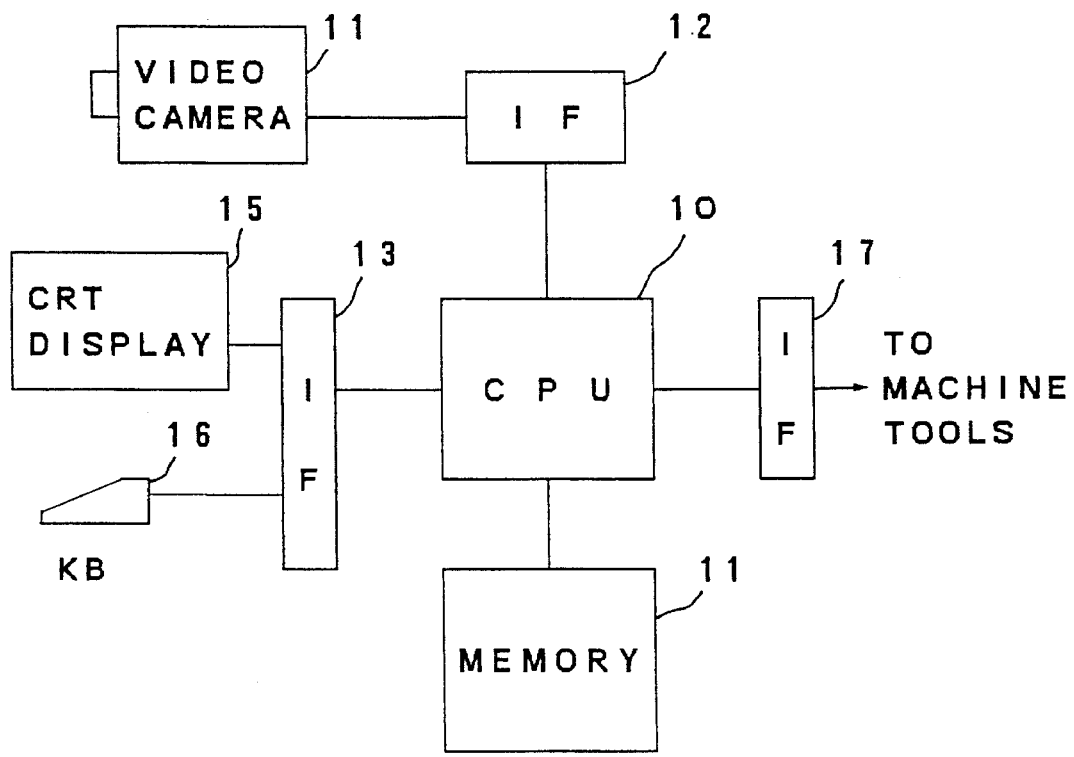
FIG. 22 is a block diagram showing the design system.

FIG. 22 is a block diagram of a design system according to a preferred embodiment of the present invention. The system is primarily composed of a CPU 10, a memory 11, interface circuits 12, 13 and 17, a video camera 14, a display 15 having a CRT, and a keyboard 16.

The image of the face of each person is captured by the video camera 14 and is transmitted to the CPU 10. The CPU 10 executes processing for designing shapes of eyeglass lenses and eyeglass frames in accordance with a control program stored in the memory 11. The designed shapes are displayed on the CRT of the display 15. Selection of words expressing a desired image and inputting of necessary information are accomplished using the keyboard 16.

The design system is connected to machine tools (not illustrated) via interface circuit 17 for transmitting data composed of polar coordinates.

Figure 23:
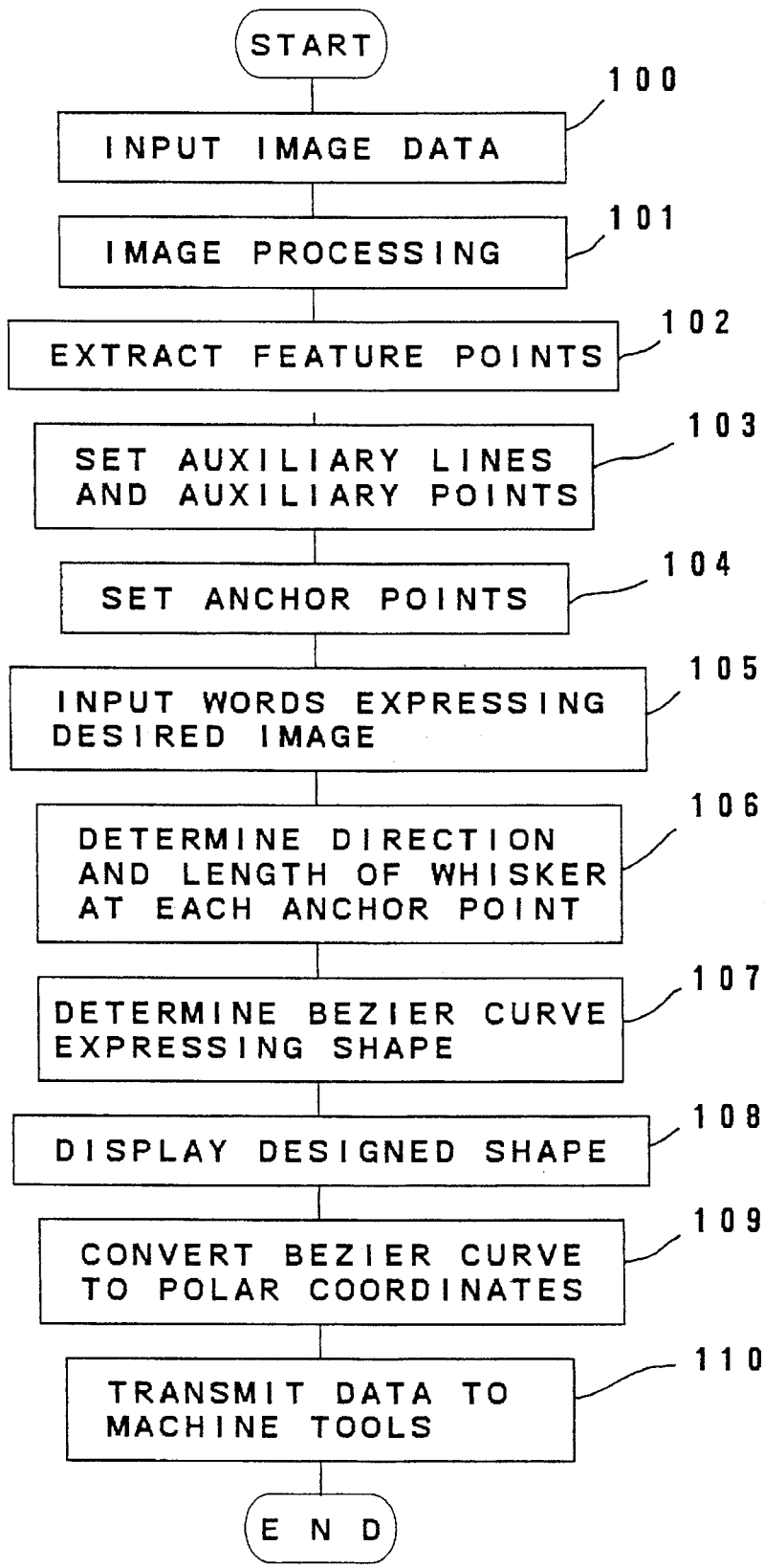
FIG. 23 is a flowchart showing the operation of the design system.

FIG. 23 is a flowchart showing the operation of the design system according to the preferred embodiment. Image data expressing an image of the face is input from the video camera in step 100 and is subjected to image processing such as color compensation and profile emphasis in step 101. Subsequently, feature points representing the facial features, which include feature points representing the profile of the face and feature points representing the features of the hair, eyebrow, eye, nose and mouth are extracted in step 102.

In step 103, horizontal auxiliary lines, vertical auxiliary lines and inclined auxiliary lines are set based on the extracted feature points. In this step, auxiliary points are also set on the auxiliary lines. Subsequently, anchor points of a Bézier curve are determined so as to define the shapes of the lenses and frame of the eyeglasses.

Further, words which are selected by each person and represent a desired design image are input in step 105, and the direction and length of the whisker at each anchor point is determined in step 106 so that control points are determined for the respective anchor points. In step 107, coefficients of a function expressing the Bézier curve are determined, and a shape expressed by the Béier curve is displayed on the CRT of the display 15 in step 108. In step 109, data expressing the Bézier curve are converted to polar coordinates, and the converted data is transmitted to machine tools in step 110.

In the design system according to the present invention, the shapes of eyeglass lenses and rims of eyeglass frames are determined based on feature points extracted from an image of the face of the purchaser and representing the facial features of the face, and words expressing a desired image possessed by the purchaser of the eyeglasses. Therefore, shapes of eyeglass lenses and the rims of eyeglass frames suitable for individual purchasers can be automatically generated.

For each person, lines fitted for the shape of the eyebrow are formed by setting anchor points AA, AB and AD. A line along the profile of the face is formed based on anchor points AE and AF. Furthermore, based on anchor point AH, the position of lenses in a direction perpendicular to the face is determined which is fitted for the length of the face and the configuration of the nose.

Subsequently, lines are formed along the nose based on anchor points AI, AJ. Arbitrary lines, such as a gentle curve and a line close to a straight line, can be automatically Generated by controlling the direction and magnitude of a vector on the Bézier curve based on words expressing a desired image.

The method employed in the present invention is totally different from the conventional method in which the designs of eyeglasses are determined by eyeglass manufacturers without considering individual consumers. According to the present invention, the shapes of eyeglass lenses and the rims of eyeglass frames can be designed at an optician's shop for each person who visits the shop. Even in the case where the salesclerks do not have a good aesthetic sense for eyeglasses, shapes or designs suitable for each purchaser can be arbitrarily generated.

Furthermore, according to the present invention, each purchaser can select eyeglasses in steps which are opposite to conventional steps. Conventionally, each purchaser must select suitable eyeglasses from many eyeglasses displayed in a shop. On the contrary, the system according to the present invention first presents for each purchaser a design or shape of eyeglasses which is suitable for the purchaser. This allows the purchaser to select one of a plurality of ready-made eyeglasses based on the suggested design. Therefore, the present invention is also advantageous in the case where purchasers select ready-made eyeglasses, because the system assists the purchasers to select designs which reflect the facial features of individual purchasers and their desires.

In the design system according to the present invention, a Bézier curve representing a generated free curve is converted to polar coordinates. By controlling various machine tools in accordance with the coordinates, eyeglass lenses and the front rims of eyeglass frames having shapes designed for individual persons can be manufactured. This enhances the flexibility in the manufacture of eyeglasses.

Obviously, numerous modifications and variations of the present invention are possible in light of the above teachings. It is therefore to be understood that within the scope of the appended claims, the present invention may be practiced otherwise than as specifically described herein.

What is claimed is:

1. A design system for designing shapes of eyeglasses comprising:

means for inputting an image of a face of a person as image data to be processed by a computer;

means for effecting image processing on said image data so that color compensation and profile emphasis are effected;

means for extracting feature points which represent a feature of the profile of the face and features of hair, eyebrows, eyes, nose and mouth of the person;

wherein the feature points which represent features of the profile of the face include points predetermined on the hairline, on the contour line from the forehead to the cheek, and on the chin, the feature points which represent features of the eyebrows include points predetermined at the inner end of the eyebrow, at the top of the eyebrow, at the tail or outer end of the eyebrow, and on a lower edge of the eyebrow, the feature points which represent features of the eyes include points predetermined at the center of the pupil, on the profile line of the iris, and on the eyelid, the feature points which represent features of the nose include points predetermined at the tip of the nose and at the peaks of the wings of the nose, the feature points which represent features of the lips include points predetermined at the depressed center portion of the upper lip, at both ends of the lips, and at the lower end of the lower lip;

means for setting a plurality of horizontal, vertical and inclined auxiliary lines and auxiliary points on said auxiliary lines, based on said feature points, and means for determining anchor points of a Bezier curve which defines the shapes of lenses and a front frame of eyeglasses.

2. A design system for designing shapes of eyeglasses according to claim 1, wherein control points provided at the anchor points of said Bezier curve are controlled based on words which represent a desired design image for the eyeglasses.

3. A design system for designing shapes of eyeglasses comprising:

means for inputting an image of a face of a person as image data to be processed by a computer;

means for effecting image processing on said image data so that color compensation and profile emphasis are effected;

means for extracting feature points which represent a feature of the profile of the face and features of hair, eyebrows, eyes, nose and mouth of the person;

wherein the feature points which represent features of the profile of the face include points predetermined on the hairline, on the contour line from the forehead to the cheek, and on the chin, the feature points which represent features of the eyebrows include points predetermined at the inner end of the eyebrow, at the top of the eyebrow, at the tail or outer end of the eyebrow, and on a lower edge of the eyebrow, the feature points which represent features of the eyes include points predetermined at the center of the pupil, on the profile line of the iris, and on the eyelid, the feature points which represent features of the nose include points predetermined at the tip of the nose and at the peaks of the wings of the nose, the feature points which represent features of the lips include points predetermined at the depressed center portion of the upper lip, at both ends of the lips, and at the lower end of the lower lip;

means for setting a plurality of horizontal, vertical and inclined auxiliary lines and auxiliary points on said auxiliary lines based on said feature points;

means for determining anchor of a Bezier curve which defines shapes of lenses and a front frame of eyeglasses;

means for converting information regarding said Bezier curve representing said defined shapes to data composed of polar coordinates; and means for transmitting said converted data to a machine tool.

4. A design system for designing shapes of eyeglasses according to claim 3, wherein control points provided at the anchor points of said Bezier curve are controlled based on words which represent a desired design image for the eyeglasses.

* * * * *